United States Patent [19]

Horton

[11] Patent Number: 4,892,715

[45] Date of Patent: Jan. 9, 1990

[54] RECOVERING MINERAL VALUES FROM ORES

[75] Inventor: Robert L. Horton, Chagrin Falls, Ohio

[73] Assignee: Phillips Petroleum Company, Bartlesville, Okla.

[21] Appl. No.: 451,699

[22] Filed: Dec. 20, 1982

[51] Int. Cl.$^4$ ............................................. C22B 60/02
[52] U.S. Cl. .................................. 423/20; 423/658.5; 423/DIG. 15; 241/14; 241/22
[58] Field of Search ................. 423/1, 658.5, DIG. 15, 423/3, 17, 18, 20; 241/14, 22

[56] References Cited

U.S. PATENT DOCUMENTS

| | | | |
|---|---|---|---|
| 1,070,313 | 8/1913 | Adams | 423/18 |
| 1,210,724 | 1/1917 | Thofehrn | 423/1 |
| 1,329,747 | 2/1920 | Berndt | 423/18 |
| 3,025,131 | 3/1962 | Lerner | 423/20 |
| 3,278,233 | 10/1966 | Hurd et al. | 299/4 |
| 3,708,206 | 1/1973 | Hard et al. | 423/17 X |
| 3,713,698 | 1/1973 | Rhoades | 423/17 X |
| 4,214,791 | 7/1980 | Moore | 423/20 X |
| 4,346,936 | 8/1982 | Yan | 423/18 X |

OTHER PUBLICATIONS

Stoltz, Jr., "Recovery of Uranium from Phosphate Ores" in *Proceedings of the Second United Nations International Conference on the Peaceful Uses of Atomic Energy*, vol. 3, *Processing of Raw Materials*, Held in Geneva 1958, pp. 234–239.

Merritt, Robert C., *The Extractive Metallurgy of Uranium*, Colorado School of Mines Research Institute, 1971, pp. 33–34, 47–48, 59–63, 70–73, 76–79, 270–273.

Tame, K. E., and J. B. Rosenbaum, "Benefication of Uranium Ores" Bureau of Mines Report of Investigations, 5884, 1961.

*Primary Examiner*—Matthew A. Thexton
*Attorney, Agent, or Firm*—Richmond, Phillips, Hitchcock & Umphlett

[57] ABSTRACT

Mineral values, particularly uranium, are recovered from ground mineral-containing ore by contacting the ground ore with an oxidizing gas and leaching with an acidic or alkaline leach solution. The oxidizing gas treatment significantly increases minerals recovery and/or significantly reduces the severity of the conditions required, particularly the temperature and the concentration of leach chemicals. Further improvements are attained by separating a total ore into a coarse fraction and a fines fraction and separately treating at least a part of these two fractions. The sequence of operations, i.e., treating with oxidizing gas and leaching, the manner of leaching and the conditions of leaching are varied to obtain significantly improved results, based on the discoveries that a coarse fraction is substantially easier to leach than the total ore or the fines fraction and treatment with an oxidizing gas significantly improves the ease of leaching, particularly of the fines fraction.

13 Claims, 8 Drawing Sheets

RECOVERING MINERAL VALUES FROM ORES

BACKGROUND OF THE INVENTION

The present invention relates to the extraction of mineral values from mineral-containing ores. In a more specific aspect, the present invention relates to the extraction of uranium values from uranium-containing ores.

Numerous minerals are present in subsurface earth formations in very small quantities which make their recovery extremely difficult. However, in most instances, these minerals are also extremely valuable, thereby justifying efforts to recover the same. An example of one such mineral is uranium. However, numerous other valuable minerals, such as copper, nickel, molybdenum, rhenium, silver, selenium, vanadium, thorium, gold, rare earth metals, etc., are also present in small quantities in subsurface formations, alone and quite often associated with uranium. Consequently, the recovery of such minerals is fraught with essentially the same problems as the recovery of uranium and, in general, the same techniques for recovering uranium can also be utilized to recover such other mineral values, whether associated with uranium or occurring alone. Therefore, a discussion of the recovery of uranium will be appropriate for all such minerals.

Uranium occurs in a wide variety of subterranean strata such as granites and granitic deposits, pegmatites and pegmatite dikes and veins, and sedimentary strata such as sandstones, unconsolidated sands, limestones, etc. However, very few subterranean deposits have a high concentration of uranium. For example, most uranium-containing deposits contain from about 0.01 to 1 weight percent uranium, expressed as $U_3O_8$ as is conventional practice in the art. Few ores contain more than about 1 percent uranium and deposits containing below about 0.1 percent uranium are considered so poor as to be currently uneconomical to recover unless other mineral values, such as vanadium, gold and the like, can be simultaneously recovered.

There are several known techniques for extracting uranium values from uranium-containing materials. One common technique is roasting of the ore, usually in the presence of a combustion supporting gas, such as air or oxygen, and recovering the uranium from the resultant ash. However, the present invention is directed to the extraction of uranium values by the utilization of aqueous leaching solutions. There are two common leaching techniques for recovering uranium values, which depend primarily upon the accessibility and size of the subterranean deposit. To the extent that the deposit containing the uranium is accessible by conventional mining means and is of sufficient size to economically justify conventional mining, the ore is mined, ground to increase the contact area between the uranium values in the ore and the leach solution, usually less than about 14 mesh but in some cases, such as limestones, to nominally less than 325 mesh, and contacted with an aqueous leach solution for a time sufficient to obtain maximum extraction of the uranium values. On the other hand, where the uranium-containing deposit is inaccessible or is too small to justify conventional mining, the aqueous leach solution is injected into the subsurface formation through at least one injection well penetrating the deposit, maintained in contact with the uranium-containing deposit for a time sufficient to extract the uranium values and the leach solution containing the uranium, usually referred to as a "pregnant" solution, is produced through at least one production well penetrating the deposit. The present invention is directed to the former, i.e., the leaching of ores.

The most common aqueous leach solutions are either aqueous acidic solutions, such as sulfuric acid solutions, or aqueous alkaline solutions, such as sodium carbonate and/or bicarbonate.

Aqueous acidic solutions are normally quite effective in the extraction of uranium values. However, aqueous acidic solutions generally cannot be utilized to extract uranium values from ore or in situ from deposits containing high concentrations of acid-consuming gangue, such as limestone. Aqueous alkaline leach solutions are applicable to all types of uranium-containing materials and are less expensive than acids.

The uranium values are conventionally recovered from acidic leach solutions by techniques well known in the mining art, such as direct precipitation, selective ion exchange, liquid extraction, etc. Similarly, pregnant alkaline leach solutions may be treated to recover the uranium values by contact with ion exchange resins, precipitation, as by adding sodium hydroxide to increase the pH of the solution to about 12, etc.

As described to this point, the extraction of uranium values is dependent to some extent upon the economics of mining versus in situ extraction and the relative costs of acidic leach solutions versus alkaline leach solutions. However, this is an oversimplification, to the extent that only uranium in its hexavalent state can be extracted in either acidic or alkaline leach solutions. While some uranium in its hexavalent state is present in ores and subterranean deposits, the vast majority of the uranium is present in its valence states lower than the hexavalent state. For example, uranium minerals are generally present in the form of uraninite, a natural oxide of uranium in a variety of forms such as $UO_2$, $UO_3$, $UO.U_2O_3$ and mixed $U_3O_8$ ($UO_2.2UO_3$), the most prevalent variety of which is pitchblende containing about 55 to 75 percent of uranium as $UO_2$ and up to about 30 percent uranium as $UO_3$. Other forms in which uranium minerals are found include coffinite, carnotite, a hydrated vanadate of uranium and potassium having the formula $K_2(UO_2)_2(VO_4)_2.3H_2O$, and uranites which are mineral phosphates of uranium with copper or calcium, for example, uranite lime having the general formula $CaO.2UO_3.P_2O_5.8H_2O$. Consequently, in order to extract uranium values from ores with aqueous acidic or aqueous alkaline leach solutions, it is necessary to oxidize the lower valence states of uranium to the soluble, hexavalent state.

Combinations of acids and oxidants which have been suggested by the prior art include nitric acid, hydrochloric acid or sulfuric acid, particularly sulfuric acid, in combination with air, oxygen, sodium chlorate, potassium permanganate, hydrogen peroxide and magnesium dioxide, as oxidants. Alkaline leachants and oxidants heretofore suggested include carbonates and/or bicarbonates of ammonium, sodium or potassium in combination with air, oxygen or hydrogen peroxide, as oxidants. However, sodium bicarbonate and/or carbonate have been used almost exclusively in actual practice.

Numerous problems obviously arise in the leaching of uranium values from uranium-containing ores. One of the most obvious is, of course, the large quantities of ores being handled and treated compared with the amount of uranium recovered. Such large quantities of ores make it costly to crush and grind the same to a size which can be effectively leached in a relatively short period of time. For example, as previously pointed out, leached ore should be reduced in size to less than about 14 mesh, but an even smaller size, in the neighborhood of 100 to 400 mesh, or smaller, would be ideal. The cost of the latter, however, becomes prohibitive. It is, therefore, desirable to reduce the degree of grinding necessary. In addition, it would be highly desirable to reduce the quantities of ores handled in any given step of the process.

The large quantities of ores being treated also increase the amounts of leachant or lixivants and oxidants required in order to recover a given amount of uranium and/or attain such recovery in a reasonable time. Thus, it is also highly desirable to reduce the amounts of leachant or lixivant and oxidant to a minimum for effective results.

While the leaching operation can be carried out at temperatures from atmospheric temperature up to about the boiling point of water, it is known that the higher the temperature, the more effective and more rapid the leaching. Consequently, the usual range of temperatures is between about 80° and about 100° C. While this temperature range appears modest for most chemical operations, in the leaching of uranium-containing ore, the temperature becomes a very significant problem. This is true since, at the high temperatures employed, the cost of materials of construction of the leaching tanks is a major factor. For example, it is necessary to use rubber lined stainless steel tanks and the manufacturers of such tanks will not assure reasonable lifetimes for the linings. Consequently, the utilization of less expensive equipment is desirable and even a small reduction in the temperature of the leaching operation can substantially reduce equipment costs and lengthen equipment life.

While it is relatively easy to recover 50% to 60% of the uranium content of an ore, at relatively low temperatures, with relatively low concentrations of leach solution and in relatively short periods of time, such recoveries are not acceptable in industrial operations. For an economic operation, recoveries in excess of about 85% of the original uranium are required and usually above 90%. This, again, contributes substantially to the cost of leach solutions. Also, as in any other operation of this type, it is relatively easy to approach the desired and economic recoveries, but it is most difficult to attain recovery of those last small increments which are necessary or desirable for an effective and economic operation.

As in any industrial operation, the time required or rate is a significant economic factor. Consequently, it would also be highly desirable to be able to increase the rate of recovery, even though no greater recovery is obtained. Here again, even a very small increase in rate makes a substantial difference in the overall operation.

SUMMARY OF THE INVENTION

It is an object of the invention to provide a method of recovering mineral values from mineral-containing ores, which overcome the above problems and disadvantages of the prior art. Another object of the present invention is to provide a method for recovering mineral values from mineral-containing ores which reduces the degree of comminution of the ore necessary and/or the cost of such comminution. Another and further object of the present invention is to provide an improved method for recovering mineral values from mineral-containing ores which reduces the volume of ores handled in at least one stage of the method. A further object of the present invention is to provide an improved method for recovering mineral values from mineral-containing ores which reduces the amount and/or cost of treating materials necessary. A still further object of the present invention is to provide a method for recovering mineral values from mineral-containing ores, which reduces the conditions of operation necessary. Yet another object of the present invention is to provide an improved leaching method for recovering mineral values from mineral-containing ores which reduces the temperature of treatment and/or the concentration of active ingredients in the leach solution. Another and further object of the present invention is to provide a method for recovering mineral values from mineral-containing ores which reduces the cost and/or extends the life of the treating equipment employed. Yet another object of the present invention is to provide a method for recovering uranium values from uranium-containing ores in accordance with any or all of the above objectives. These and other objects and advantages of the present invention will be apparent from the following description.

In accordance with the present invention, mineral values are recovered from mineral-containing ores, particularly uranium values from uranium-containing ores, (1) by contacting ground mineral-containing ore with an oxidizing gas in at least one first contacting step, contacting said ground uranium ore with a leach solution, adapted to solvate a significant amount of the mineral values in at least one second contacting step, separating a pregnant leach solution containing the thus solvated mineral values from residual solids and recovering the solvated mineral values from the pregnant leach solution. (2) In a preferred embodiment, the ground ore is separated into a coarse fraction and a fines fraction and at least one of the fractions is treated in accordance with the subject method. The leaching step may be carried out before or after the separation of the ore into a coarse fraction and a fines fraction. Further improvement can be attained by (3) adding a diluent solid material, such as a portion of the coarse fraction to the fines fraction, prior to the leaching of the fines fraction and/or (4) by recycling the effluent from the leaching step to the step of contacting the ore with an oxidizing gas and/or contacting the ore with a leach solution.

DESCRIPTION OF THE PREFERRED EMBODIMENTS

Figure 1:
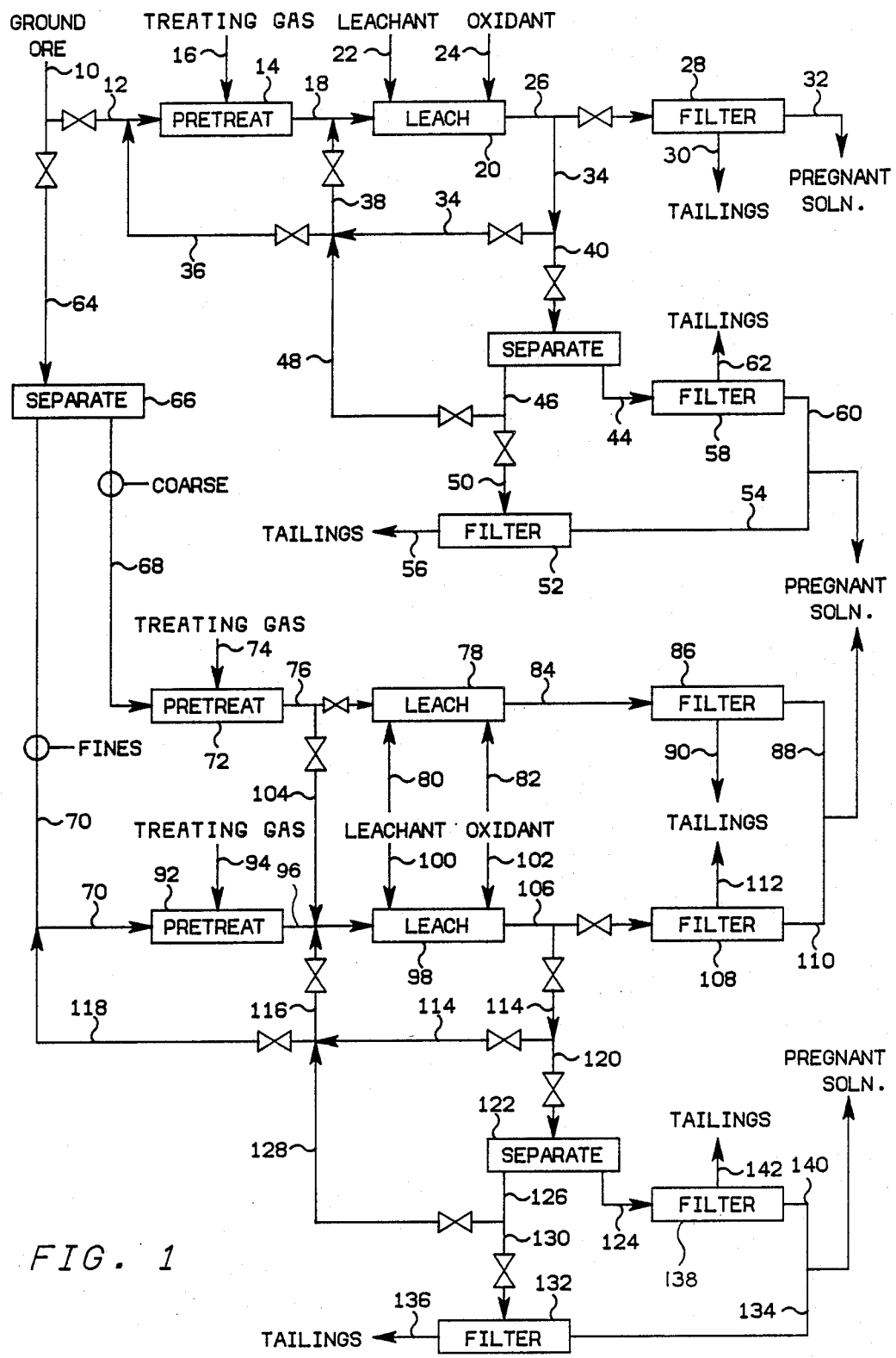
FIG. 1 of the drawings is a simplified flow diagram illustrating one embodiment of the present invention.

When utilized in the present application and in the claims, the term, "leachant", or "lixivant" is meant to include an acid or alkaline compound whose aqueous solution is adapted to dissolve or solvate and retain in solution mineral values.

When the term "diluent solid material" is utilized herein, this term is meant to include inert solids, such as gravel, glass beads, etc., or at least a part of larger particle size ground ore, leached ore, roasted ore, etc.

The term "barren" is meant to refer to any portion of an ore from which mineral values have been extracted to the economic or practical limit. By contrast, a "residual" ore may include any portion of the ore from which mineral values have been extracted to the practical or economic limit or any portion of the ore from which lesser amounts of mineral values have been extracted.

When "barren ore" or "residual ore" is to be disposed of without further extraction of mineral values, such ore will be generally referred to as "tailings".

When the term "alkaline" is utilized in the present application and in the claims, this term is meant to include salts having an alkali metal, an alkaline earth metal or ammonimum as a cation. The anion portion of these salts may be strongly basic anions, such as hydroxide, phosphate, sulfide or carbonate, or weakly basic anions, such as bicarbonate, acetate or dihydrogen phosphate.

The term "mild conditions" when referred to herein is meant to include conditions of temperature and/or concentration of active ingredients in a leach solution significantly below conditions necessary to obtain equivalent results without the use of an oxidizing gas in accordance with the present invention and in the case of temperature near ambient temperature.

When an ore is ground and separated into a coarse fraction and a fines fraction, the latter often being referred to as "slime", the fines fraction will normally contain a substantially larger quantity of mineral values, particularly uranium, as compared with the coarse fraction. In addition, it has been found that it is easier to leach uranium from the coarse fraction than from the fines fraction. Specifically, a greater percentage of the uranium can be leached from the coarse fraction with leach solutions of essentially the same concentration, essentially the same amount of uranium can be extracted from the coarse fraction with lower concentrations of leach solutions, the temperature of the leaching step can be lower in the leaching of the coarse fraction and/or essentially the same percentage of uranium can be leached from the coarse fraction, as compared with the fines fraction, in a shorter period of time. Consequently, substantial benefits can be attained by separately leaching the coarse and fine fractions. For example, by leaching the coarse fraction separately, the quantities of acid or alkali and oxidant can be reduced to some extent, thus reducing the cost of chemicals, a lower temperature can be used, the cost of equipment can be reduced and/or its life extended, the over all recovery of uranium can be increased and the time in which a given amount of uranium can be recovered is reduced. It has also been found that, if the separated fines fraction is mixed with a diluent solid material, still further, significant improvements in the previously mentioned areas can also be obtained. While such benefits may be obtained by separately leaching the coarse fraction and the fines fraction, at mild conditions of leach solution concentration and temperature and at severe conditions of leach solution concentration and temperature, respectively, it is also possible to carry out all of the leaching under mild conditions, thereby attaining still further benefits.

It has also been found in accordance with the present invention that improved results can be obtained in a method for recovering mineral values from ground mineral containing ores by treating the ore with an oxidizing gas either before or after leaching the ore with a leach solution adapted to solvate mineral values contained therein. Still further improvement can be attained by carrying out such treatment with an oxidizing gas and leaching in accordance with the above-mentioned techniques, particularly, when the ore is separated into a coarse and a fines fraction and treating only the fines fraction with the oxidizing gas.

Oxidizing gases useful in accordance with the present invention include any normally gaseous oxidizing gas. Preferably, the oxidizing gas is a gas selected from the group consisting of nitrogen oxides, sulfur oxides, and halogens, or still more preferably, the oxidizing gas is selected from the group consisting of nitrogen oxides and halogens. Suitable sulfur oxides include $SO_2$, $SO_3$, mixtures thereof and the like. Suitable nitrogen oxides include NO, $NO_2$ mixtures thereof and the like. Halogen gases may include chlorine, fluorine, bromine, iodine, chlorine monofluoride, bromine monofluoride, iodine monochloride, mixtures thereof, etc.

It has also been found that results are improved to some extent, if the ore is wet at the time it is treated with the oxidizing gas. Accordingly, the ore is preferably wet to a degree sufficient to saturate the ore with water or the ore is in a form of a slurry in water prior to contacting with the oxidizing gas.

The amount of oxidizing gas utilized may be varied over a rather wide range. However, it has also been found that an amount of oxidizing gas sufficient to saturate the ore with oxidizing gas provides improved results.

Mined ore is generally crushed and then ground, for example, by the use of ball mills or rod mills. Conventionally, the ore is ground to a particle size less than about 100 mesh and in some cases, less than about 325 mesh, depending upon the nature of the ore. However, practicing the present invention, the ore may be ground to the above-mentioned fineness but coarser ores may be advantageously treated. For example, the ore can be ground so that a majority passes a 30 mesh screen and preferably so that the majority passes a 14 mesh screen. Again, the size will vary according to the nature of the ore but overall will be substantially larger than that treated in accordance with conventional practice. When the ore is separated into a coarse fraction and a fines fraction, such separation may be done by screening, for example, to produce a fines fraction of which a majority will pass through a 20 mesh screen or smaller. For example, one type of uranium ore can be screened so that a majority passes a screen in the neighborhood of about 400 mesh, while another specific uranium-containing ore would be screened so that a majority passes a screen in the neighborhood of about 300 mesh. However, it is preferred that the separation be carried out by wet classification, which is known to those skilled in the art of minerals recovery. In the present case, where wet classification is utilized, the solids which float in the solution are separated and are referred to as the fines fraction, whereas the solids which settle out of the solution are referred to as the coarse fraction. For example, wet classification of the two specific uranium-containing ores referred to above resulted in coarse fractions of about 91% being retained by a 400 mesh screen in the first case and about 87% being retained by a 325 mesh screen in the second case. To the extent that inappropriate amounts of water are present in the coarse and/or fines fractions to form a suitable leaching slurry, water may be added or removed so that the proper solids content is provided. For example, between about 50% to about 70% by weight of solids.

Diluent solid materials utilizable in accordance with the present invention, include inert materials such as gravel, glass beads and the like, generally having about the same particle size as the previously mentioned coarse fraction of the ore, at least a portion of leached barren ore or roasted barren ore attained from a coarse fraction or a portion of the unleached or partially leached coarse fraction. The amount of inert solids added to the fines fraction may be any appropriate amount, such as between about 40% and about 60% of the total weight of the mixture, preferably, in the neighborhood of about 50%.

The amount of acid and/or alkaline material utilized conventionally is between about 180 and about 400 pounds per ton of ore. By contrast, in accordance with the present invention, amounts less than about 180 pounds per ton can be utilized. The amount of oxidant is generally between about the stoichiometric amount necessary for conversion of all of the uranium to a hexavalent state up to as high as two times the stoichiometric amount. This generally results in an oxidant concentration from about 10 to about 80 pounds per ton of ore. Again, in accordance with the present invention, amounts less than about 10 pounds per ton can be utilized. Further, as previously indicated, the leaching temperature can be anywhere from atmospheric to about the boiling point of water and for best results, the temperature is usually between about 80° C. and about 100° C. In accordance with the present invention, temperatures below about 80° C. and often ambient temperatures can be utilized in the leaching step. It is possible to carry out the leaching operation as a batch-type ore continuous operation and a continuous operation can be carried out either countercurrently or concurrently. Contacting times in a leaching step will also vary according to the particle size of the ore, the concentration of the leachant and oxidant and the temperature. Generally, contact times between about 24 and 48 hours or more are necessary. However, in accordance with another aspect of the present invention, the contact time can be reduced below about 24 hours, for example, about 20 hours. In batch-type operations, the leaching is generally carried out in about 3 to 7 sequential contacting steps. When practicing the present invention, this number can be reduced. Similarly, a batch-type treatment with oxidizing gas is preferably carried out in a plurality of sequential steps. For example, two to three.

The following description when read in conjunction with the drawings will further illustrate the present invention.

Referring specifically to FIG. 1, ground ore may be introduced through line 10. In one alternative procedure, the total ore, i.e. without size separation, is passed through line 12 to pretreating step 14. Treating gas is introduced to step 14 through line 16. As previously indicated, pretreating step 14 may be carried out as a continuous process or as a plurality of individual contacting steps. Contact with the treating gas may either be concurrent or countercurrent. The pretreated ore is then passed through line 18 to a leaching step 20. In leaching step 20, leachant is introduced through line 22 and oxidant through line 24 or both may be previously combined and introduced through a single line. In any event, as previously indicated, a leaching step may be carried out continuously or batch wise, by countercurrent or concurrent contact and in a plurality of sequential steps, for example, 2 to 7 or more. The effluent from leaching step 20 is passed through line 26 to a step for separating leach solution or a pregnant leach solution from residual solids. In the present case, the separation is generally indicated as a filtering step 28. Residual solids discharged through line 30, generally referred to as tailings, are disposed of in any suitable manner. The pregnant leach solution is discharged through line 32 and the mineral values recovered therefrom in any conventional manner. The effluent from leaching step 20 passing through line 26 or any part thereof, may also be recycled through line 34 and combined with unpretreated ore through line 36 or with pretreated ore through line 38. In yet another alternative, all or part of the effluent from leaching step 20 may be passed through line 40 to a separation step 42, which is preferably a wet separation, to separate a coarse fraction discharged through line 44 and a fines fraction discharged through line 46. The fines fraction, or a part thereof, may be recycled through line 48 and ultimately combined with ore to pretreating step 14 and/or ore to leaching step 20. Any remaining fines fraction is passed through line 50 to an appropriate filtering step 52 and the pregnant leach solution discharged through line 54, while the tailings or residual solids are discharged through line 56. Likewise, the coarse fraction passing through line 44 may be filtered in filtering step 58, the pregnant leach solution discharged through line 60 and the tailings discharged through line 62.

In accordance with another embodiment of the present invention, as illustrated in FIG. 1, the ground ore from line 10 or a part thereof, may be passed through line 64 to a separation step 66. Again, the separation is preferably wet separation and the ore is separated into a coarse fraction passed through line 68 and a fines fraction passed through line 70. The coarse fraction is then passed to pretreating step 72 where it is contacted with the treating gas introduced through line 74. The pretreated ore discharged through line 76 is then passed to leaching step 78 where it is contacted with leachant introduced through line 80 and oxidant introduced through line 82. Effluent from leaching step 78 is passed through line 84 to a separation step, as illustrated by filtering step 86, where pregnant leach solution is separated and discharged through line 88 and residual ore or tailings are discharged through line 90. The fines fraction passing through line 70 is passed to pretreating step 92 where it is contacted with treating gas introduced through line 94. The thus pretreated ore is then passed through line 96 to leaching step 98 where it is contacted with a leachant introduced through line 100 and an oxidant introduced through line 102. In another alternative, all or a part of pretreated coarse fraction may be passed through line 104 and combined with the pretreated fines fraction to leaching step 98. The effluent from leaching step 98 is passed through line 106 to the filtering step 108. The separated pregnant leach solution is discharged through line 110 and the residual solids or tailings through line 112. The effluent from leaching step 98 or a part thereof may be recycled through line 114 and added to the pretreated fines fraction to leaching step 98 through line 116 and/or the untreated fines fraction to pretreating step 92 through line 118. To the extent that all or a part of the effluent from leaching step 98 and passing through line 114 contains contains at least a part of the coarse fraction, a preferred operation involves passing such effluent through line 120 to a separation step 122 where it is separated into a coarse fraction discharged through line 124 and a fines fraction discharged through line 126. All or a part of the fines fraction from line 126 may be recycled through line 128 and ultimately combined with pretreated fines through line 116 or untreated fines through line 118. Any separated fines fraction not thus recycled would be discharged through line 130 to filtering step 132 where pregnant leach solution is separated and discharged through line 134 and residual ore or tailings are discharged through line 136. The coarse fraction passing through line 124 is then passed to separation or filtering step 138 where the pregnant leach solution is separated and discharged through line 140 and the tailings are discharged through line 142. All or some of the leaching steps can be carried out under mild conditions as previously discussed.

Figure 2:
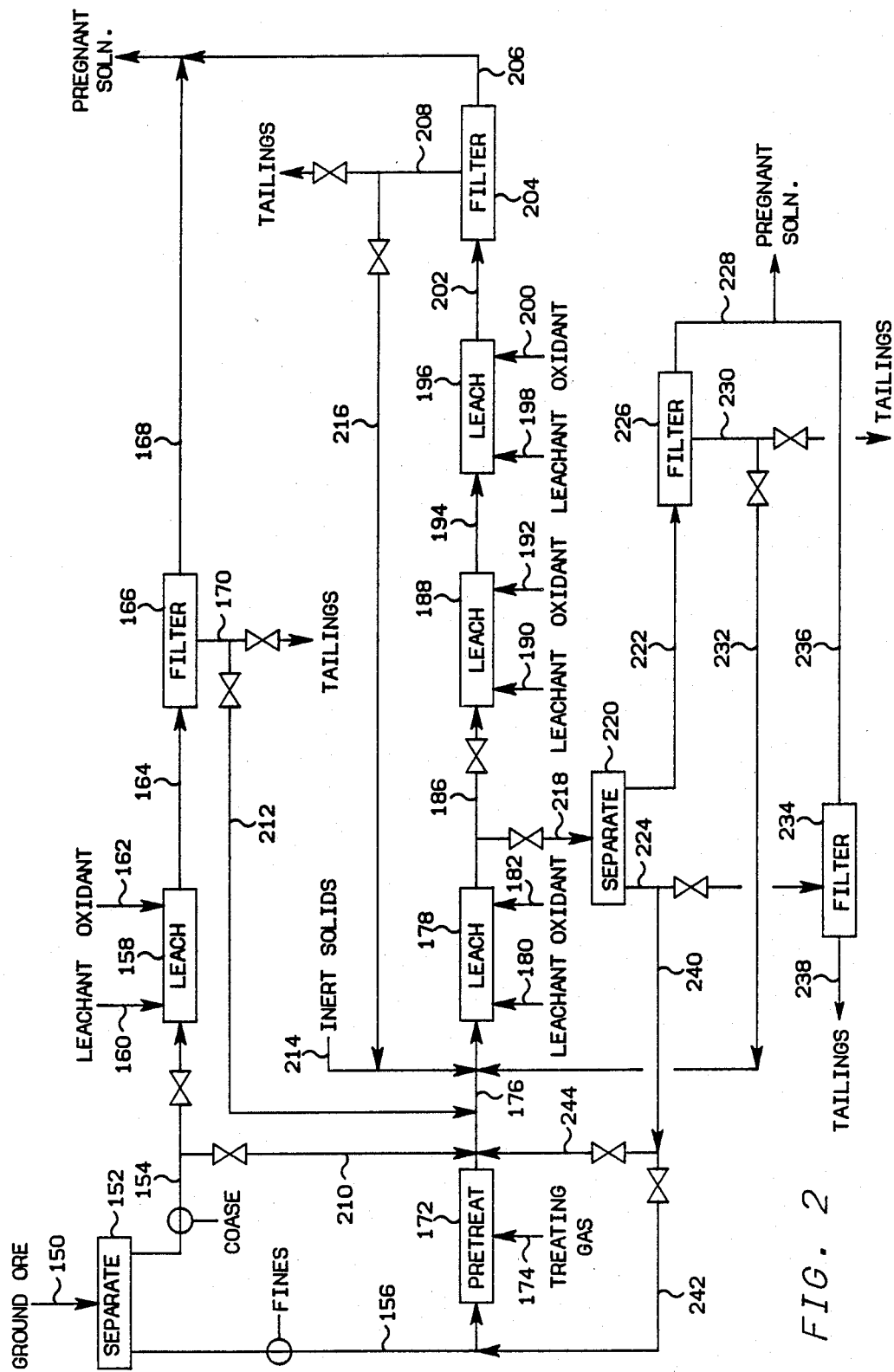
FIG. 2 is a simplified flow diagram illustrating another embodiment of the present invention.

FIG. 2 of the drawings illustrates another embodiment in accordance with the present invention. In accordance with FIG. 2, ground ore is introduced through line 150 to a separating step 152. In separating step 152, the ore is separated into a coarse fraction discharged through line 154 and a fines fraction discharged through line 156. The coarse fraction then passes through line 154 to leaching step 158 where it is contacted with a leachant introduced through line 160 and an oxidant introduced through line 162. The effluent from leaching step 158 then passes through line 164 to an appropriate separation step, such as filtering step 166, where pregnant leach solution is separated and discharged through line 168 and residual ore or tailings is discharged through line 170. The fines fraction passing through line 156 is passed to pretreating step 172 where it is contacted with a treating gas introduced through line 174. The pretreated ore is then passed through line 176 to a leaching step 178 where it is contacted with a leachant introduced through line 180 and an oxidant introduced through line 182. The leached ore may be then repeatedly leached as by passing the effluent from leaching step 178 through line 186 to leaching step 188 where it is contacted with leachant introduced through line 190 and oxidant introduced through line 192 and thence through line 194 to leaching step 196 where it is contacted with leachant introduced through line 198 and oxidant introduced through line 200. The effluent from leaching step 196 is then passed through line 202, to separation or filtering step 204 where it is separated into a pregnant leach solution discharged through line 206 and a residual ore or tailings portion discharged through line 208. As previously indicated, it has been found that mixing a diluent solid material with the fines fraction improves the recovery of mineral values therefrom. Accordingly, part of the coarse fraction may be passed through line 210 and combined with the pretreated fines fraction to leaching step 178. Similarly, residue or tailings passing through line 170, that is a barren coarse ore fraction, may be passed through line 212 and combined with the pretreated fines fraction to leaching step 178. As yet another alternative, an inert solid material may be introduced through line 214. Yet another alternative would involve recycling all or a part of the tailing from filtering step 204 through line 216 and combining the same with pretreated fines fraction to leaching step 178. Alternatively, the effluent from any one of leaching steps 178, 188 or 196 can be recycled to leaching step 178 with or without first removing pregnant leach solution therefrom. To the extent that coarse material has been added to the fines fraction to leaching step 178, as just described, all or a part of the effluent from leaching step 178 can be passed through line 218 to separation step 220 where it is separated into a coarse fraction discharged through line 222 and a fines fraction discharged through line 224. The coarse fraction would then be passed to the filter 226 where the pregnant leach solution is separated and discharged through line 228 and the residual ore or tailings is discharged through line 230. All or a part of the coarse residual ore from line 230 may be recycled through line 232 and combined with pretreated fines passing to leaching step 178. The fines fraction passing from separator 220 through line 224 would be passed through filter 234 where it is separated into pregnant leach solution discharged through line 236 and residual ore or tailings discharged through line 238. All or a part of the separated fines from line 224 may be passed through line 240 for recycle to and combination with untreated fines, as through line 242, and/or pretreated fines as through line 244. Obviously, withdrawal of effluent from a leaching step, as through line 218, and the subsequent treatment thereof, could be carried out following any one or all of leaching steps 178, 188 and 196.

Figure 3:
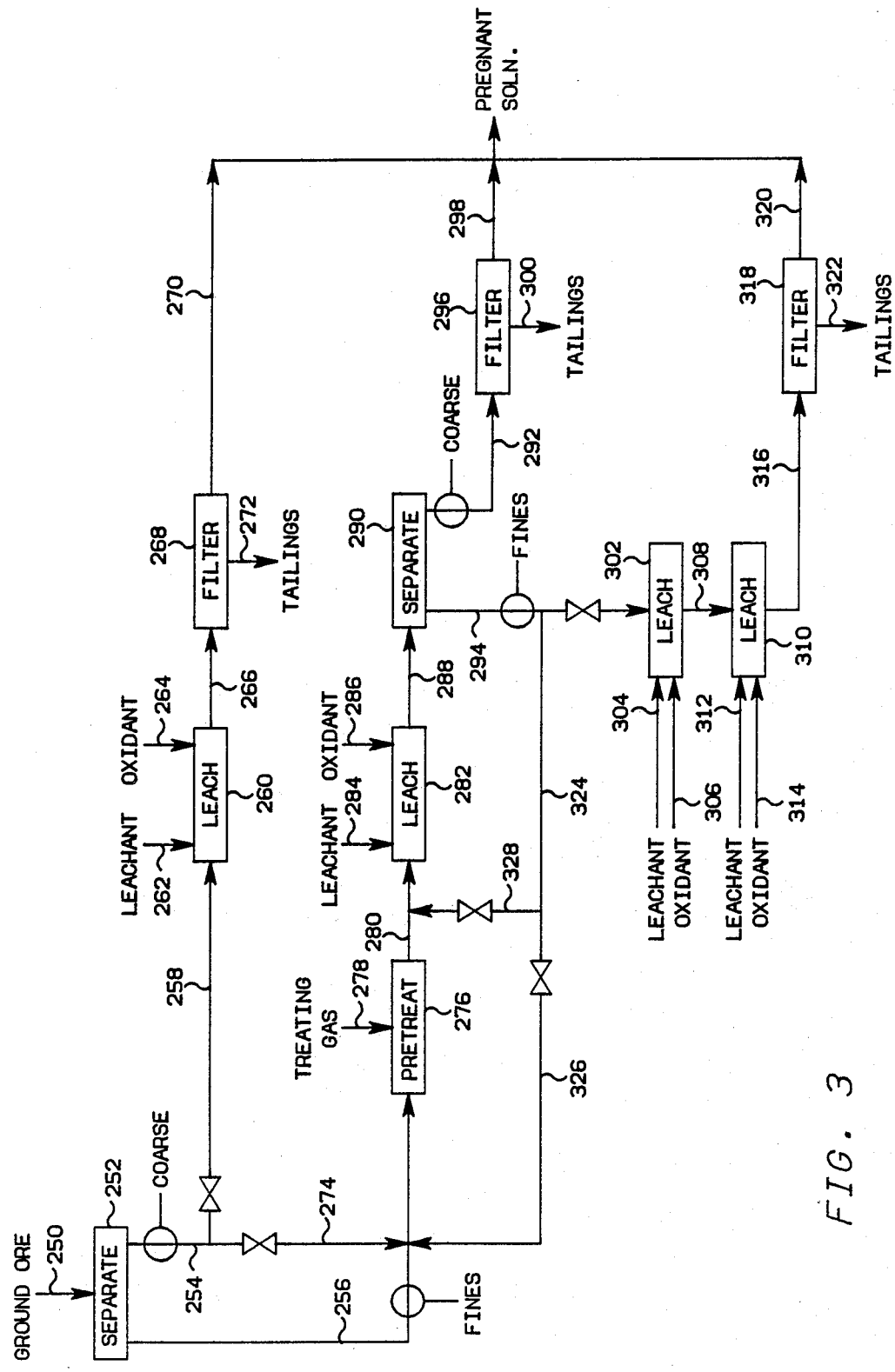
FIG. 3 of the drawings is a simplified flow diagram illustrating yet another embodiment of the present invention.

FIG. 3 of the drawings shows yet another embodiment of the present invention. In accordance with FIG. 3, ground ore is introduced through line 250 to separation step 252. In separation step 252, the ore is separated into a coarse fraction discharged through line 254 and a fines fraction discharged through line 256. A portion of the coarse fraction is passed through line 258 to leaching step 260 where it is contacted with a leachant introduced through line 262 and an oxidant introduced through line 264. The effluent from leaching step 260 passes through line 266 to a filter 268 where the pregnant leach solution is separated and discharged through line 270 and residual solids or tailings are discharged through 272. A second part of the coarse fraction is passed through line 274 where it is combined with the fines fraction and sent to pretreating step 276. In pretreating step 276, the mixture of ore is contacted with a treating gas introduced through line 278. The treated ore then passes through line 280 to leaching step 282. In leaching step 282, the mixed ore is contacted with a leachant introduced through line 284 and an oxidant introduced through line 286. The effluent from leaching step 282 is passed through line 288 to separating step 290. Separating step 290 is preferably a wet separation technique wherein the mixture of ore is again separated into a coarse fraction discharged through line 292 and a fines fraction discharged through line 294. The coarse fraction is then passed to separation means or filter 296 where pregnant leach solution is separated and discharged through line 298 and residual ore or tailings are discharged through line 300. The fines fraction from separator 290 is passed to a second leaching step 302 where it is contacted with leachant introduced through line 304 and an oxidant introduced through line 306. The effluent from leaching step 302 passes through line 308 to a third leaching step 310 where it is contacted with leachant introduced through line 312 and oxidant introduced through line 314. From leaching step 310, the effluent passes through line 316 to a filtering step 318 where it is separated into a pregnant leach solution discharged through line 320 and tailings discharged through line 322. All or a part of the fines from separation step 290 or any of the subsequent leaching steps 302 and 310 may be recycled through line 324 and combined with the untreated fines by passage through line 326 and/or with the pretreated ore by passing the same through line 328. Obviously such recycling of the fines fraction can be continuous in which only a part of the fines is recycled or intermittent wherein all of the fines fraction is recycled for a period of time and, thereafter, recycling is terminated and the fines are either withdrawn from the system or passed through the subsequent leaching steps 302 and 310.

Figure 4:
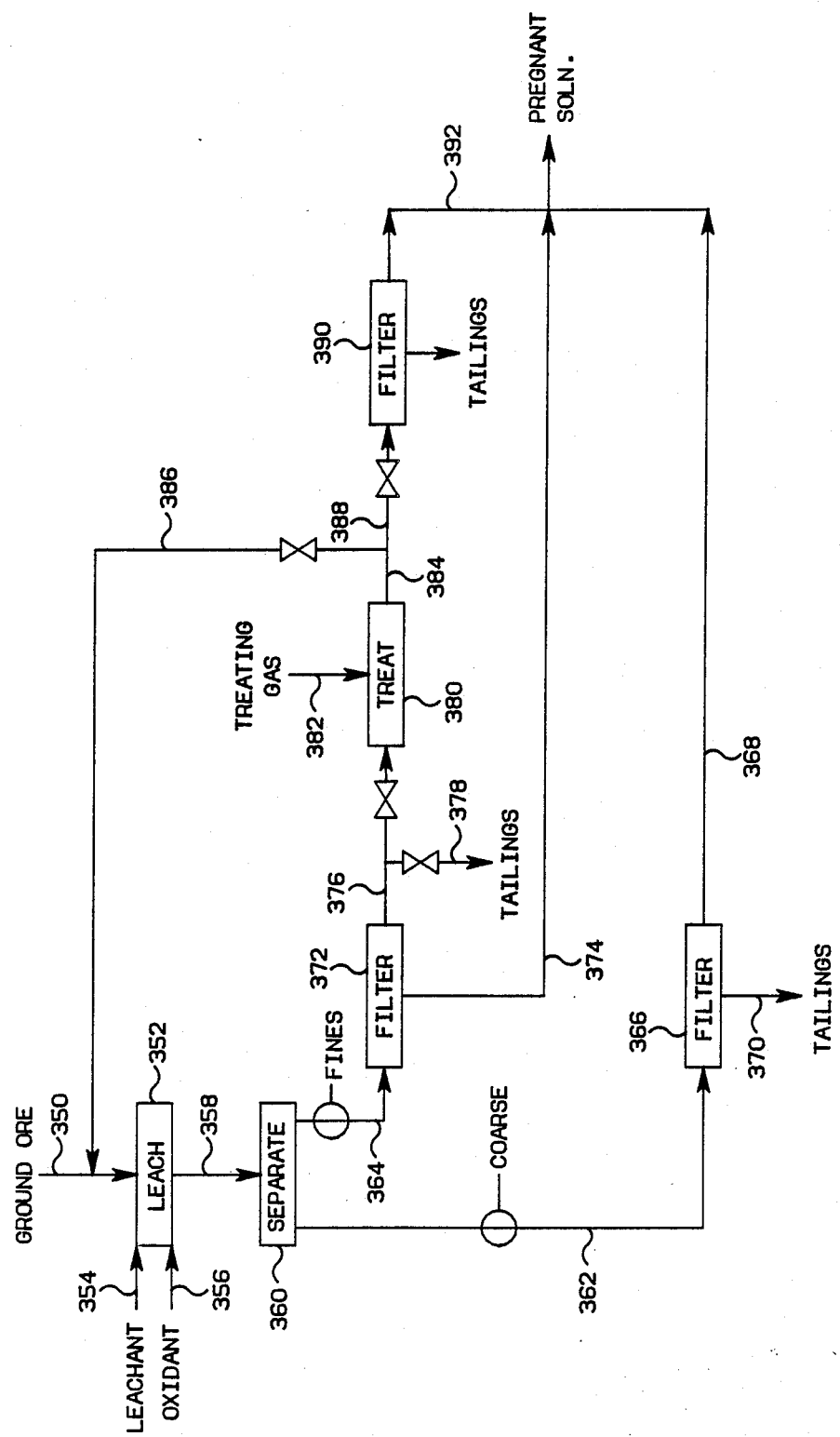
FIG. 4 is a simplified flow diagram illustrating still another embodiment of the present invention.

In the embodiment shown in FIG. 4, ground ore is introduced through line 350 to leaching step 352 where it is contacted with a leachant introduced through line 354 and an oxidant introduced through line 356. In this particular case, leaching step 352 is carried out under mild conditions. For example, the temperature can be at least about 5° C. below the temperature which would normally be utilized for optimum extraction of uranium from the particular ore in question. Stated differently, the temperature can be at least 5° C. below the temperature at which leaching without treatment with treating gas at some point in the system would result in essentially the same recovery. Similarly, the active ingredient of a leachant, for example, sulfuric acid can be less than about 90% of that which would normally be used for the particular ore and, as will be apparent from the examples hereinafter presented, amounts as low as about 60% of that normally utilized have been found effective. The concentration of oxidant in the leachant may be below about 80% of that required under normal conditions, again being effective in concentrations as low as 60% of the normal amount, as exemplified hereinafter. It should also be recognized at this point that any of the leaching steps discussed in the previous embodiments can be carried out and preferably are carried out under mild conditions, keeping in mind that where the ore is separated into a coarse and a fines fraction, leaching of the coarse fraction requires less severe conditions than leaching of a fines fraction, that treatment of the total ore, a coarse fraction and/or a fines fraction with treating gas in accordance with the present invention renders the ore more readily leachable and permits the use of mild leaching conditions and that treatment of a fines fraction with treating gas in accordance with the present invention is most effective and that it is preferred that only the fines fraction be thus treated. The last becomes particularly significant when it is recognized that the fines fraction represents only a small part of the total ore, for example, in one particular instance, about 14% of the total ore. Effluent from leaching step 352 passes through line 358 to separation step 360. Separation step 360, as in the previous discussion, is preferably a wet classification in which a coarse fraction is separated from a fines fraction with the former being discharged through line 362 and the latter being discharged through line 364. The coarse fraction is then subjected to a separation to separate pregnant leach solution from tailings, as represented by filtering step 366. The pregnant leach solution is discharged through line 368 and the residual solids or tailings through line 370. The fines fraction passing through line 364 is passed through filtering step 372 where pregnant leach solution is separated and passed through line 374 and the residual ore is passed through line 376. All or a part of the separated ore may be at least intervally withdrawn as tailings through line 378. Preferably, however, all of the separated fines fraction is passed to treating step 380 where it is contacted with treating gas introduced through line 382. The treated fines fraction is then passed through line 384. All or a part of the pretreated fines fraction is preferably recycled through line 386 and combined with the fresh total ore passing to leaching step 352. As previously discussed, any recycling can be carried out in a number of ways, for example, all of the ore, or any part thereof may be recycled for a period of time and thereafter all or part withdrawn from the system through line 388. Such a cyclic operation could be carried out intervally during a continuous operation of the system. Alternatively, the recycling may be a continuous recycling of a part of the treated fines, while the remainder is withdrawn from the system. The proportions thus recycled and withdrawn being selected to attain optimum results. Fines fraction withdrawn through line 388 is passed to filtering step 390 where pregnant leach solution is separated and discharged through line 392 and tailings or residual ore which is discharged through line 394.

Figure 5:
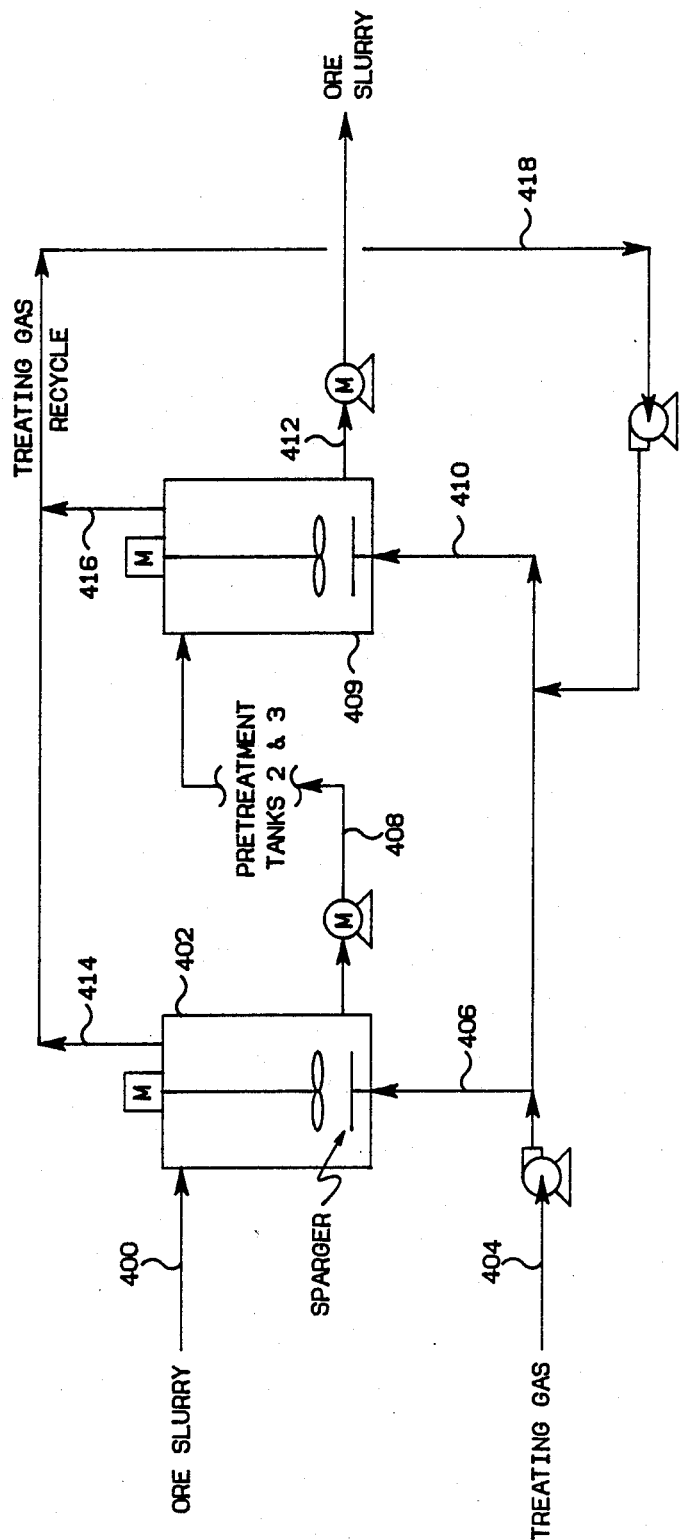
FIG. 5 is a simplified diagram illustrating one method of contacting ore in accordance with the present invention.
Figure 6:
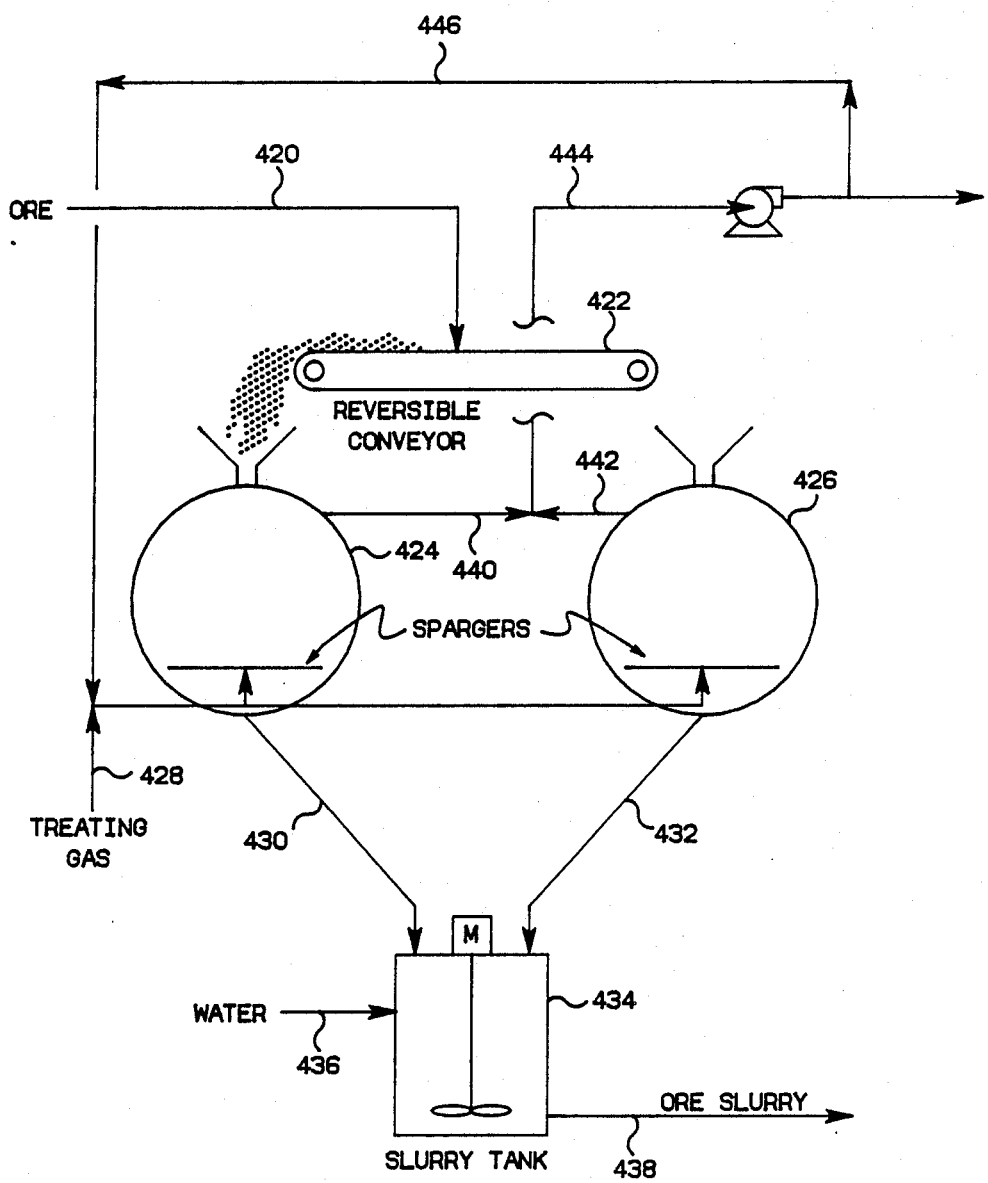
FIG. 6 is a simplified diagram illustrating another method of treating an ore in accordance with the present invention.
Figure 7:
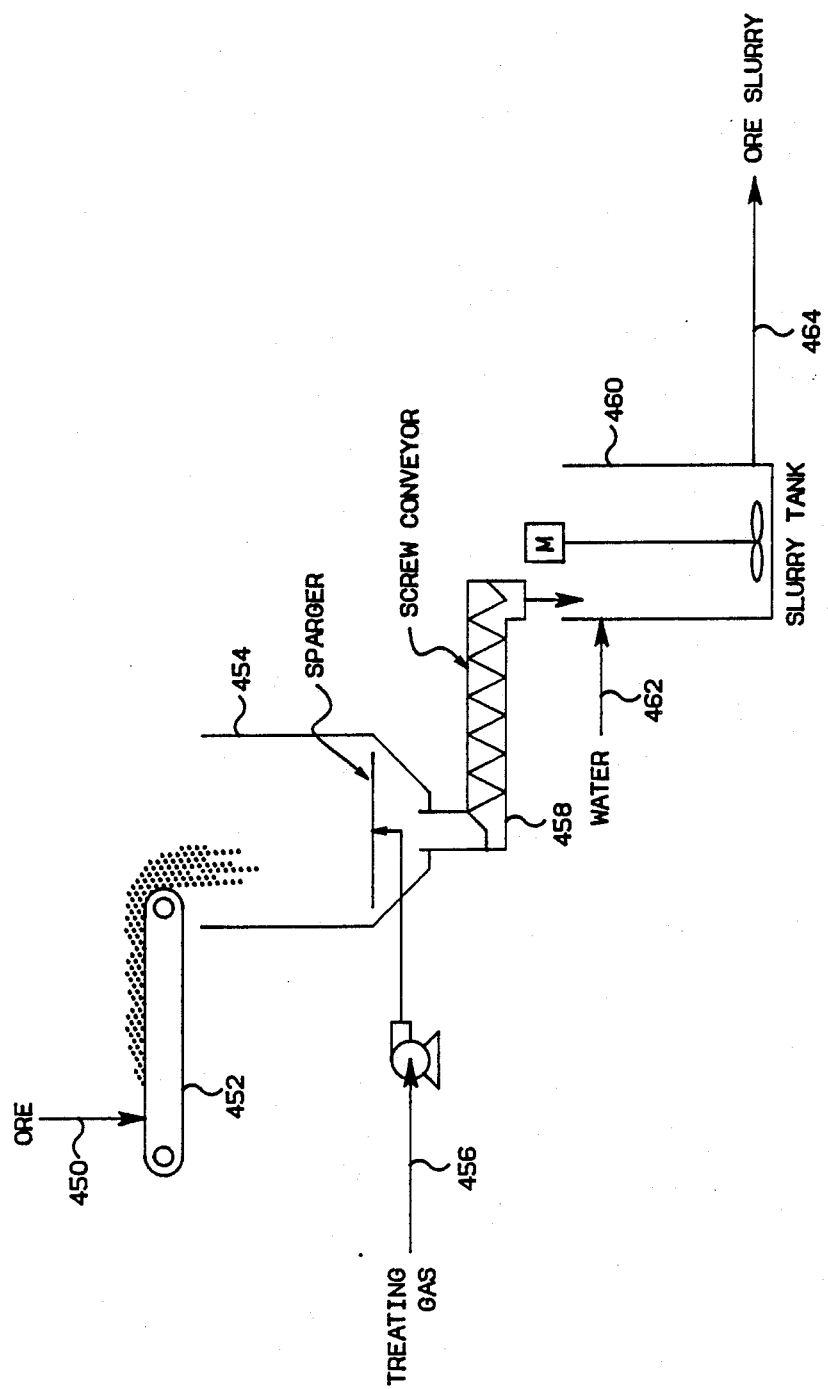
FIG. 7 is a simplified diagram illustrating yet another method of treating an ore in accordance with the present invention.

FIGS. 5, 6 and 7 illustrate various means of treating total ore or any fraction thereof with treating gas in accordance with the present invention. It should be recognized that these systems are illustrative only and that numerous other arrangements will be apparent to one skilled in the art.

In accordance with FIG. 5, an aqueous ore slurry, for example, 60% solids, is introduced through line 400 to a first pretreatment tank 402. Treating gas is introduced through line 404 and thence through line 406 to pretreatment tank 402. The treating gas is distributed by means of a sparger located at the bottom of treating tank 402. The thus pretreated ore is then passed through line 408, thence through an intermediate series of pretreatment tanks similar to tank 402, for example pretreatment tanks 2 and 3 (not shown) and finally to a fourth pretreatment tank 408. Tank 408 is also of the same character as tank 402, with treating gas being introduced through line 410. The thus pretreated ore is then discharged through line 412 where the ore slurry is subjected to at least one leaching step. Treating gas may be completely absorbed by the ore, or if added in excess may be withdrawn from tanks 402 and 408 through lines 414 and 416, respectively, for recycle through line 418. By way of specific example, a specific difficult to leach ore would contain at least about 120 pounds of moisture per ton of ore. About 16 pounds of treating gas per ton of ore would be used in the pretreatment for a period of 10 hours at ambient temperature and pressure. FIG. 5 thus illustrates a continuous operation where the ore is first slurried.

FIG. 6 illustrates a batch-type pretreatment. In accordance with FIG. 6, ore is introduced through line 420 onto a reversible conveyor, 422. From the reversible conveyor, the ore is fed to one of treating tanks 424 or 426, depending upon the direction of travel of the conveyor. Treating gas is introduced through line 428. The pretreated ore is then passed from treating tanks 424 and 426 through lines 430 and 432, respectively, to slurry tank 434. In slurry tank 434, water is added through line 436 to form a slurry of ore, which is discharged through line 438 to the subsequent leaching operation. Treating gas in treating tanks 424 and 426 may be reacted to extinction by the ore or if added in excess may be withdrawn through lines 440 and 442, respectively, thence through line 444 and all or a part thereof may be recycled through line 446. In this particular instance, the ore introduced through line 420 is preferably wetted to a certain degree, preferably saturated with water, since it has been found that pretreatment is more effective when the ore is wet. In a closed system such as that illustrated in FIG. 6, it is preferable to evacuate the treating tanks prior to the introduction of treating gas thereto.

FIG. 7 of the drawings illustrates a continuous operation in which the ore is pretreated in an open tank system. Specifically, ore is introduced through line 450 to a conveyor 452. The ore is fed to an open pretreatment tank 454 where it is contacted with treating gas introduced through line 456. The treated ore is continuously removed from the bottom of treatment tank 454 by means of screw conveyor 458. The treated ore from the screw conveyor is then passed to slurry tank 460 where water is added through line 462. The ore slurry is discharged through line 464 for subsequent leaching.

The following examples illustrate the advantages of the various aspects of the present invention. While these tests were laboratory tests, it is believed that the results thereof can be directly scaled up to a field operation. A substantial number of experiments were conducted on this project and the inclusion of all of these tests would only confuse and unduly lengthen the present application. However, the tests reported herein are representative of the trends observed during the course of the experimental work.

In a first series of tests an ore, ground to less than about 14 mesh and representing a total ore, i.e., without separation of coarse and fines, was treated with NO. The treatment comprised contacting the ore with NO in air. The appearance of a brown gas indicated that the NO was oxidized by oxygen in the air to $NO_2$. It is difficult to say whether the reaction was with the NO or $NO_2$ or both. In any event, by shaking the ore with the gas, most of the brown color disappeared and a total weight gain of about 0.9 grams per 100 grams of ore was observed. The thus treated ore was then leached with a leachant comprising sulfuric acid and sodium chlorate under the conditions set forth in Table I.

TABLE I

| Run | lb/Ton | $NO_x$[1] Adsorbed, % of Ore | Leach Conditions[2] | | | | Residue Wt. % $U_3O_8$ | Uranium Extraction, % |
|---|---|---|---|---|---|---|---|---|
| 1 | 22.6 | 1.13 | 200 | 12 | 80 | 20 | 0.0058 | 96.6 |

TABLE I-continued

| Run | lb/Ton | $NO_x$[1] Adsorbed, % of Ore | Leach Conditions[2] | | | | Residue Wt. % $U_3O_8$ | Uranium Extraction, % |
|---|---|---|---|---|---|---|---|---|
| 2 | 6.2 | 0.31 | 200 | 12 | 80 | 20 | 0.0085 | 95.0 |
| 3 |  | none | 240 | 14 | 80 | 20 | 0.0058 | 96.6 |

[1]$NO_x$ treatment at atmospheric pressure, 95° C. for 2 hours.
[2]The respective numbers are sulfuric acid, lb/ton; sodium chlorate, lb/ton; leach temperature, °C.; leach time, hours.

It is to be observed from Table I that when the ore is treated with the $NO_x$ gas and thereafter leached, essentially the same extraction of uranium can be obtained as that obtained when a nontreated ore is leached at more severe conditions, which have previously been determined to be optimum for the particular ore in question. Specifically, when the gas treatment was utilized, essentially the same results could be obtained by treating the ore with about 83% of the sulfuric acid previously determined to be optimum and about 84% of the amount of sodium chlorate previously determined to be optimum. Thus, it is clear that pretreatment with the oxidizing gas significantly reduces the severity of the conditions necessary and, specifically, substantially reduces the amount of acid and oxidant required.

In another series of tests, the total ore, which was the same as that used in the previous experiment, was pretreated with varying amounts of gaseous chlorine and the ore was also wetted with varying amounts of water. The ore was then leached under the conditions set forth in the following Table II:

TABLE II

| Run No. | Chlorine Pretreatment g/100 g | lb/Ton | Water, Wt. % of Ore | Leach Conditions* | | | | % U Extracted |
|---|---|---|---|---|---|---|---|---|
|  |  |  |  | Acid | Chlorate | °C. | Hrs. |  |
| 1 | None |  | 0.0 | 180 | 9 | 75 | 20 | 83.7 |
| 2 | 0.10 | 2.0 | 0.0 | 180 | 9 | 75 | 20 | 87.9 |
| 3 | 1.42 | 28.4 | 0.0 | 180 | 9 | 75 | 20 | 93.6 |
| 4 | 1.45 |  | 1.97 | 180 | 9 | 75 | 20 | 91.7 |
| 5 | 1.18 | 23.8 | 3.94 | 180 | 9 | 75 | 20 | 95.4 |
| 6 | 1.46 |  | 5.92 | 180 | 9 | 75 | 20 | 95.4 |

*Acid (sulfuric) and chlorate (sodium) quantities are in lb/ton of ore.

The above data indicate the effectiveness of the treatment with chlorine. During this series of experiments, it was concluded that the optimum chlorine dosage was about 1 gram per 100 grams of ore and the treatment was most effective when the ore was wetted with about 4% by wt. of water prior to chlorine treatment.

Another series of tests was carried out under even more mild conditions in which the same ore was treated with chlorine, bromine and monoiodine chloride, respectively, and compared with a run without oxidizing gas pretreatment. The results of this series of tests are set forth below:

TABLE III

| Run No. | Pretreatment, g/100 g | | Water, Wt. % of Ore | Leach Conditions* | | | | % U Extracted |
|---|---|---|---|---|---|---|---|---|
|  |  |  |  | Acid | Chlorate | °C. | Hrs. |  |
| 1 | $Cl_2$ | 0.80 | 5.92 | 150 | 9 | 75 | 20 | 92.6 |
| 2 | $Br_2$ | 1.04 | 5.92 | 150 | 9 | 75 | 20 | 86.1 |
| 3 | ICl | 0.80 | 5.92 | 150 | 9 | 75 | 20 | 86.3 |
| 4 | None |  | 0.0 | 150 | 9 | 75 | 20 | 80.09 |

*Acid (sulfuric) and chlorate (sodium) quantities are in lb/ton of ore.

It is clear from this series of test that even under very mild conditions, the treatment with an oxidizing gas, and in particular a halogen, resulted in substantial improvement in uranium recovery.

The previously utilized ore was also separated into a coarse and a fines fraction and the fines fraction only was treated with varying amounts of chlorine and thereafter leached under the conditions set forth in Table IV below:

TABLE IV

| Run No. | Chlorine Pretreatment g/100 g | Water, Wt. % of Ore | Leach Conditions* Acid | Chlorate Fines Only | °C. | Hrs. | % U Extracted |
|---|---|---|---|---|---|---|---|
| 1 | None | 0.0 | 200 | 12 | 80 | 20 | 46.7 |
| 2 | 0.84 | 0.0 | 200 | 12 | 80 | 20 | 55.7 |
| 3 | 0.59 | 13.13 | 200 | 12 | 80 | 20 | 69.1 |
| 4 | 0.50 | 26.25 | 200 | 12 | 80 | 20 | 72.5 |

*Acid (sulfuric) and chlorate (sodium) quantities are in lb/ton of ore.

The above summarized runs indicate that very significant improvement in the percent uranium extracted was obtained by pretreating the fines fraction only with chlorine and thereafter leaching under relatively mild conditions.

In yet another series of experiments, total ore was about 75% saturated with water (5.92 g/water per 100 grams of ore), was pretreated with varying amounts of chlorine and was thereafter leached under mild conditions. The results of this series of tests are set forth in Table V below:

TABLE V

| Run No. | Pretreatment g/100 | Water g/ 100 g Ore | Leach Conditions* Acid | Chlorate | °C. | Hrs. | % U Extracted | Residue Wt. % $U_3O_8$ |
|---|---|---|---|---|---|---|---|---|
| 1 | $Cl_2$ - 0.10 | 5.92 | 180 | 9 | 75 | 20 | 88.9 | 0.0184 |
| 2 | $Cl_2$ - 0.20 | 5.92 | 180 | 9 | 75 | 20 | 86.1 | 0.0234 |
| 3 | $Cl_2$ - 0.40 | 5.92 | 180 | 9 | 75 | 20 | 93.0 | 0.0125 |
| 4 | $Cl_2$ - 0.80 | 5.92 | 180 | 9 | 75 | 20 | 96.6 | 0.0056 |
| 5 | $Cl_2$ - 1.00 (Saturated) | 5.92 | 180 | 9 | 75 | 20 | 95.6 | 0.0076 |

*Acid and Chlorate quantities are in lb/ton of ore

Figure 8:
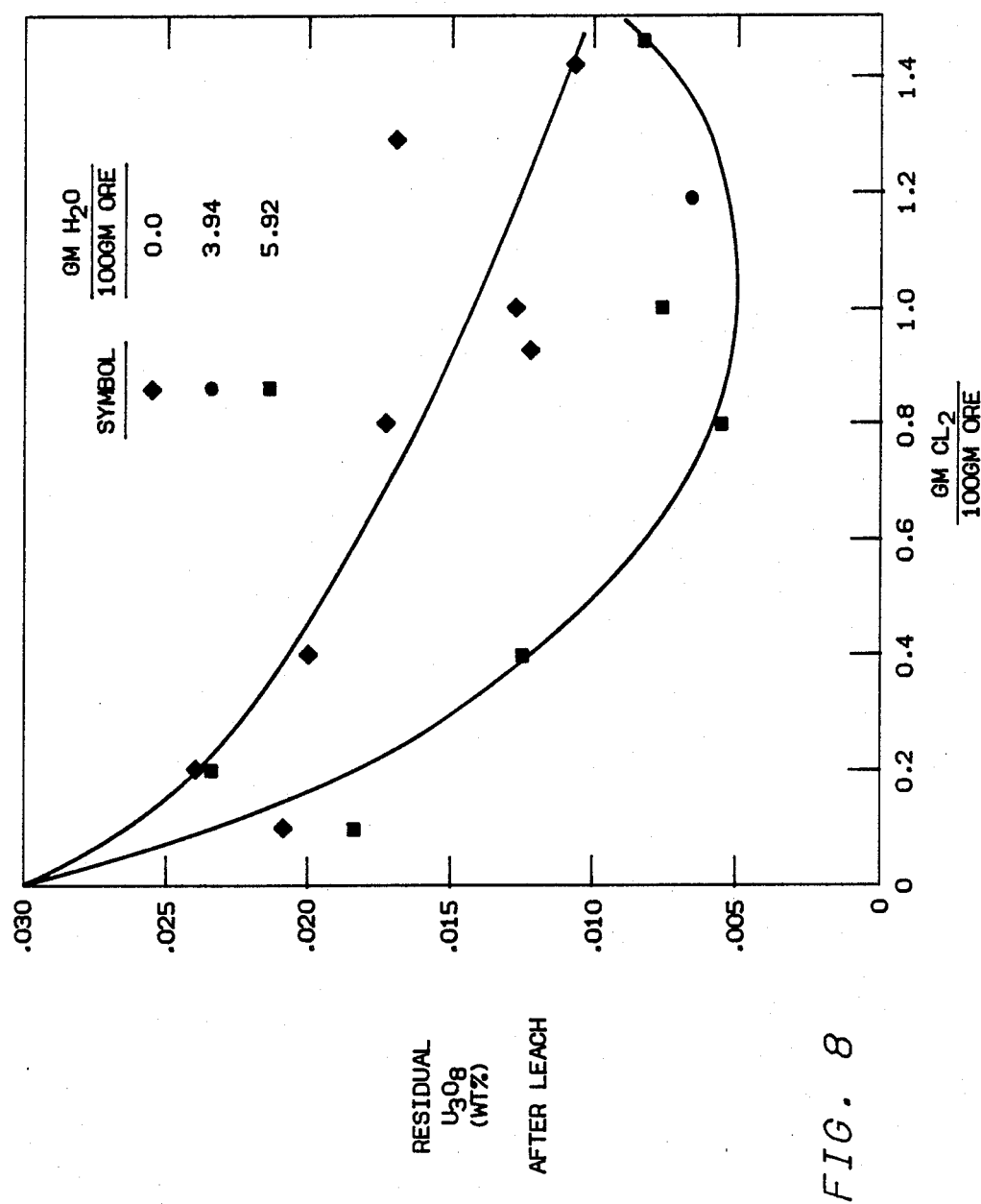
FIG. 8 is a plot of residual uranium vs. concentration of treating gas.

Another series of tests was conducted treating a total ore of the character previously utilized to illustrate the effects of varying the amount of water in the ore at the time of treatment as well as variations in the amount of chlorine utilized in the treatment. The results of this series of runs are plotted and appear herein as FIG. 8, which is a plot of residual $U_3O_8$ after leaching with 180 pounds per ton of sulfuric acid, 9 pounds per ton of sodium chlorate, at 75° C. and for 20 hours. It is to be observed that the wet ore was leached to a substantially lower residual uranium content than dry ore. It also appears that the minimum residual uranium was attained utilizing between about 0.8 grams chlorine per 100 grams of ore and about 1.3 grams of chlorine per 100 grams of ore with the optimum at about 1.05.

In another series of experiments, an ore considered relatively easy to leach was leached with sulfuric acid at 100 pounds per ton and sodium chlorate at 3 pounds per ton, utilizing a temperature of about 60° C. for 4 hours. About 85% of the original uranium was removed, yielding a "barren" ore. The barren ore was then wet classified to separate a coarse fraction comprising about 80.5% of the total ore and containing about 0.013% $U_3O_8$ and a fines fraction comprising about 19.5% of the total ore containing about 0.033% $U_3O_8$. A composite of equal volumes of the above-mentioned coarse and fines was then formed which contained about 0.0244% $U_3O_8$. This composite was leached under the same conditions resulting in 51.3% extraction of the remaining uranium. A like composite was then treated with 0.8 grams chlorine per 250 grams of ore and leached under the same conditions. This last treatment resulted in the removal of 60.8% of the remaining uranium, leaving a residue containing only 0.008% $U_3O_8$. This example illustrates that the addition of part of the coarse fraction (less than that in the total ore) to the fines fraction improves the extraction of the fines fraction.

Another ore was conventionally crushed and ground to less than 30 mesh and part thereof wet classified to yield a coarse fraction comprising about 86% of the ore and a fines fraction (less than 140 mesh) representing about 14% of the ore. 250 gram samples were utilized in the series of experiments which are summarized in the following Table VI:

TABLE VI

| Run No. | Sample Description | Chlorine Pretreating/ 100 g. | Leach Conditions* $H_2SO_4$ | $NaClO_3$ | °C. | Hrs. | Residue Wt % $U_3O_8$ |
|---|---|---|---|---|---|---|---|
| 1 | Coarse fraction only | none | 150 | 9 | 75 | 20 | 0.005 |
| 2 | Total ore | none | 240 | 14 | 80 | 20 | 0.008 |
| 3 | Total ore | none | 180 | 9 | 75 | 20 | 0.031 |
| 4 | Total ore | 1.42 | 180 | 9 | 75 | 20 | 0.016 |
| 5 | 50-50 Mixture of Fines and Coarse | 0.46 | 150 | 9 | 75 | 20 | 0.036 |
| 6 | Residue from Run 5 | 0.47 | 150 | 9 | 75 | 20 | 0.016 |
| 7 | Residue from Run 6 | 0.44 | 150 | 9 | 75 | 20 | 0.002 |

*Chemical quantities are in pounds per ton of ore treated

The first two runs of Table VI demonstrate that coarse ore is significantly easier to treat than the total ore in that the residue is lower in uranium in a second run than in the first, even though the concentration of acid and chlorate are higher in Run No. 2 and the temperature of treatment was higher. Runs 3 and 4 demonstrate that chlorine pretreatment of the total ore followed by a relatively mild acid leaching significantly improves leachability. Finally, Runs 5 through 7 show that repeated mild leaching of a chlorine treated 50—50 mixture of fines and coarse gives substantially improved results.

While specific materials, modes of operation and equipment have been referred to herein, it is to be understood that such recitals are for purposes of illustration and setting forth the best mode of operation of the present invention and are not to be considered limiting.

That which is claimed:

1. A method for recovering uranium from ground uranium-containing ore, comprising:
   (a) pretreating said ground ore with a gas selected from the group consisting of (1) a halogen gas and (2) a nitrogen oxide gas, in at least one pretreating step for a time sufficient to essentially saturate said ore with said gas;
   (b) leaching said ground ore with an aqueous leach solution, comprising; less than about 180 pounds per ton of ore of sulfuric acid and less than about 10 pounds per ton of sodium chlorate, at a temperature between atmospheric temperature and about 80° C., in at least one leaching step;
   (c) separating a first part of the effluent from said leaching step into a pregnant leach solution containing said uranium values and residual solids; and
   (d) separating a second part of the effluent from the leaching step into a coarse fraction and a fines fraction and at least part of the total fines fraction, containing fluids from the leaching step, is recycled to at least one of (1) the pretreating step and (2) the leaching step.

2. A method for recovering uranium from ground uranium-containing ore, comprising:
   (a) separating said ground ore into a coarse fraction and a fines fraction;
   (b) pretreating said coarse fraction in a first pretreating step with a gas selected from the group consisting of (1) a halogen gas and (2) a nitrogen oxide gas, in at least one first pretreating step for a time sufficient to essentially saturate said ore with said gas;
   (c) leaching at least a part of said coarse fraction in a first leaching step with an aqueous leach solution, comprising; less than about 180 pounds per ton of ore of sulfuric acid and less than about 10 pounds per ton of sodium chlorate, at a temperature between atmospheric temperature and about 80° C., in at least one first leaching step;
   (d) separating the effluent from said first leaching step into a pregnant leach solution containing said uranium values and residual solids;
   (e) pretreating said fines fraction in a second pretreating step with a gas selected from the group consisting of (1) a halogen gas and (2) a nitrogen gas, in at least one second pretreating step for a time sufficient to essentially saturate said ore with said gas;
   (f) leaching said fines fraction in a second leaching step with an aqueous leach solution, comprising; less than about 180 pounds per ton of ore of sulfuric acid and less than about 10 pounds per ton of sodium chlorate, at a temperature between atmospheric temperature and about 80° C., in at least one second leaching step; and
   (g) separating at least a part of the effluent from said second leaching step into a pregnant leach solution containing said uranium values and residual solids.

3. A method in accordance with claim 2 wherein a part of the total effluent from the second leaching step, containing fluids from said second leaching step, is recycled to at least one of (1) the second pretreating step and (2) the second leaching step.

4. A method in accordance with claim 2 wherein part of the effluent from the first pretreating step is added to the second leaching step.

5. A method in accordance with claim 4 wherein part of the total effluent from the second leaching step, containing fluids from said second leaching step, is recycled to at least one of (1) the second pretreating step and (2) the second leaching step.

6. A method in accordance with claim 2 a part of the effluent from the second leaching step is further separated into a second coarse fraction and a second fines fraction, in a second separation step, and at least part of the total second fines fraction, containing fluids from said second leaching step, is recycled to at least one of (1) the second pretreating step, and (2) the second leaching step.

7. A method for recovering uranium from ground uranium-containing ore, comprising:
   (a) separating said ground ore into a coarse fraction and a fines fraction;
   (b) leaching at least a part of said coarse fraction in a first leaching step with an aqueous leach solution, comprising; less than about 180 pounds per ton of ore of sulfuric acid and less than about 10 pounds per ton of sodium chlorate, at a temperature between atmospheric temperature and about 80° C., in at least one first leaching step;
   (c) separating at least a part of the effluent from said first leaching step into a pregnant leach solution containing said uranium values and residual solids;
   (d) pretreating said fines fraction with a gas selected from the group consisting of (1) a halogen gas and (2) a nitrogen gas, in at least one pretreating step for a time sufficient to essentially saturate said ore with said gas;
   (e) leaching said fines fraction in a second leaching step with an aqueous leach solution, comprising; less than about 180 pounds per ton of ore of sulfuric acid and less than about 10 pounds per ton of sodium chlorate, at a temperature between atmospheric temperature and about 80° C., in at least one second leaching step; and
   (f) separating at least a part of the effluent from said second leaching step into a pregnant leach solution containing said uranium values and residual solids.

8. A method in accordance with claim 7 wherein part of the effluent from the second leaching step is additionally leached in at least one third leaching step.

9. A method in accordance with claim 7 wherein at least one of (1) part of the unleached first coarse fraction, (2) at least part of a residual coarse fraction produced by separating fluids from the effluent from the first leaching step and (3) inert solids is added to the second leaching step.

10. A method in accordance with claim 9 wherein part of the effluent from the second leaching step is further separated into a second coarse fraction and a second fines fraction, in a second separation step, and at least a part of said second fines fraction, containing fluids from said second leaching step, is recycled to one of (1) the pretreating step and (2) said second leaching step.

11. A method in accordance with claim 10 wherein fluids are separated from the second coarse fraction to produce a barren second coarse fraction and at least part of said barren second coarse fraction is added to the second leaching step.

12. A method in accordance with claim 9 wherein a part of the effluent from the second leaching step is further separated into a second coarse fraction and a second fines fraction, in a second separation step, fluids are separated from said second coarse fraction to produce a barren second coarse fraction and at least part of said barren second coarse fraction is added to the second leaching step.

13. A method in accordance with claim 10 wherein part of the second fines fraction is additionally leached in at least one third leaching step.

* * * * *